(12) United States Patent
Choudhary et al.

(10) Patent No.: US 12,407,512 B2
(45) Date of Patent: Sep. 2, 2025

(54) SECURING A COMPUTING DEVICE ACCESSORY

(71) Applicant: Microsoft Technology Licensing, LLC, Redmond, WA (US)

(72) Inventors: Mahima Choudhary, Huntington Beach, CA (US); Ankur Choudhary, Redmond, WA (US); Chong He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 18/069,876

(22) Filed: Dec. 21, 2022

(65) Prior Publication Data

US 2024/0214202 A1 Jun. 27, 2024

(51) Int. Cl.
 *H04L 9/32* (2006.01)
(52) U.S. Cl.
 CPC .......... *H04L 9/3213* (2013.01); *H04L 9/3234* (2013.01); *H04L 9/3263* (2013.01)
(58) Field of Classification Search
 CPC .... H04L 9/3213; H04L 9/3234; H04L 9/3263
 USPC ........................................................ 713/168
 See application file for complete search history.

(56) References Cited

U.S. PATENT DOCUMENTS

| | | | |
|---|---|---|---|
| 7,194,629 B2 | 3/2007 | Silverbrook | |
| 7,401,223 B2 | 7/2008 | Walmsley | |
| 9,124,434 B2 | 9/2015 | Krishnamurthy et al. | |
| 9,130,910 B1 | 9/2015 | Logue | |
| 9,397,980 B1 | 7/2016 | Chen | |
| 12,143,895 B2* | 11/2024 | Movva | H04W 4/029 |
| 2003/0159038 A1 | 8/2003 | Gilbert et al. | |
| 2003/0212895 A1 | 11/2003 | Kisliakov | |

(Continued)

FOREIGN PATENT DOCUMENTS

| | | |
|---|---|---|
| CN | 101464934 A | 6/2009 |
| CN | 102239675 A | 11/2011 |

(Continued)

OTHER PUBLICATIONS

"The Transport Layer Security (TLS) Protocol Version 1.3", Retrieved From https://datatracker.ietf.org/doc/html/rfc8446, Aug. 2018, 160 Pages.

(Continued)

*Primary Examiner* — Lan Dai T Truong
(74) *Attorney, Agent, or Firm* — Workman Nydegger

(57) ABSTRACT

An online service may use a computing system to authenticate a remote accessory device by establishing an encrypted communication channel with the remote accessory device, the remote accessory device being connected to a host device. Then, using the encrypted communication channel, obtain a device certificate possessed by the remote accessory device. The online service may then receive a first device token from the remote accessory device and determine whether the first device token exists within a token history associated with the device certificate. Based on the first device token existing within the token history, the online service may then determine that the remote accessory device is an authentic device; generate a second device token for the remote accessory device; store the second device token in the token history associated with the device certificate; and send the second device token to the remote accessory device.

20 Claims, 6 Drawing Sheets

(56) References Cited

U.S. PATENT DOCUMENTS

| | | |
|---|---|---|
| 2006/0106836 A1 | 5/2006 | Masugi et al. |
| 2008/0196086 A1 | 8/2008 | Shintani et al. |
| 2009/0083372 A1 | 3/2009 | Teppler |
| 2009/0187983 A1 | 7/2009 | Zerfos et al. |
| 2010/0058064 A1 | 3/2010 | Kirovski et al. |
| 2010/0075604 A1 | 3/2010 | Lydon et al. |
| 2010/0169222 A1 | 7/2010 | Qawami et al. |
| 2010/0217985 A1 | 8/2010 | Fahrny et al. |
| 2011/0004549 A1* | 1/2011 | Gray .................. G06F 21/572 709/224 |
| 2011/0051933 A1 | 3/2011 | Koo et al. |
| 2011/0078483 A1 | 3/2011 | Islam |
| 2011/0093714 A1 | 4/2011 | Schaecher et al. |
| 2011/0126005 A1 | 5/2011 | Carpenter et al. |
| 2011/0138192 A1 | 6/2011 | Kocher et al. |
| 2011/0167262 A1 | 7/2011 | Ross et al. |
| 2011/0271296 A1 | 11/2011 | Tu et al. |
| 2011/0314284 A1 | 12/2011 | Chou |
| 2012/0221473 A1 | 8/2012 | Redmann et al. |
| 2012/0229250 A1 | 9/2012 | Lim |
| 2013/0031261 A1 | 1/2013 | Suggs |
| 2013/0031540 A1 | 1/2013 | Throop et al. |
| 2013/0182845 A1 | 7/2013 | Monica et al. |
| 2014/0068744 A1 | 3/2014 | Bran et al. |
| 2014/0223174 A1 | 8/2014 | Krishnamurthy et al. |
| 2015/0082420 A1 | 3/2015 | Love et al. |
| 2015/0341177 A1 | 11/2015 | Ylimartimo et al. |
| 2016/0085960 A1 | 3/2016 | Priev et al. |
| 2016/0134621 A1 | 5/2016 | Palanigounder |
| 2017/0006029 A1 | 1/2017 | Pedersen |
| 2017/0063834 A1 | 3/2017 | Gryb et al. |
| 2020/0186438 A1 | 6/2020 | Patel et al. |
| 2020/0267552 A1 | 8/2020 | Lee |
| 2021/0076204 A1* | 3/2021 | Goyal ................... H04L 67/306 |
| 2021/0112061 A1* | 4/2021 | Cremin .................. H04L 63/14 |
| 2021/0377257 A1* | 12/2021 | Asher .................. H04L 9/3268 |
| 2022/0116230 A1 | 4/2022 | Dietrich et al. |
| 2023/0254302 A1* | 8/2023 | Ramezanpour ....... H04L 9/3247 713/156 |
| 2024/0031354 A1* | 1/2024 | Horowitz ............ H04L 63/0823 |

FOREIGN PATENT DOCUMENTS

| | | |
|---|---|---|
| CN | 102546584 A | 7/2012 |
| EP | 2469902 A1 | 6/2012 |
| EP | 2951976 B1 | 10/2018 |
| JP | 2008278086 A | 11/2008 |
| JP | 2010502115 A | 1/2010 |
| JP | 2010061490 A | 3/2010 |
| JP | 2010518758 A | 5/2010 |
| KR | 20090065336 A | 3/2009 |
| WO | 2007108114 A1 | 9/2007 |
| WO | WO-2010068779 A2 * | 6/2010 ........... G06F 21/445 |

OTHER PUBLICATIONS

Lee, et al., "Product sharing model for games", Retrieved From https://learn.microsoft.com/en-us/gaming/gdk/_content/gc/commerce/fundamentals/xstore-product-sharing-model-for-games, Aug. 20, 2022, 9 Pages.

International Search Report and Written Opinion received for PCT Application No. PCT/US2023/081709, Mar. 18, 2024, 12 pages.

"Configuring and Using Security for Personal Communications," Retrieved at http://publib.boulder.ibm.com/infocenter/pcomhelp/v5r9/index.jsptopic=/com.ibm.pcomm.doc/books/html/admin_guide13.html, on Aug. 23, 2012, 20 pages.

"Hardware security modules (HSMs)," SafeNet Inc, retrieved from http://www.safenet-inc.com/products/data-protection/hardware-security-modules-hsms/, retrieved on Aug. 23, 2012, 5 pages.

"Inside Secure's new NFC-based security chip protects high-end consumer products", retrieved from http://www.electronicspecifier.com/Circuit-Protection/VaultIC150-INSIDE-Secures-new-NFC-based-security-chip-protects-high-end-consumer-products.asp, Nov. 10, 2011, 3 pages.

Communication Pursuant to Article 94(3) received for European Patent Application No. 14708136.8, mailed on Sep. 1, 2016, 4 pages.

Communication under Rule 71(3) EPC received in European Patent Application No. 14708136.8, mailed on Feb. 2, 2018, 5 pages.

Communication under Rule 71(3) EPC received in European Patent Application No. 14708136.8, mailed on Jun. 29, 2018, 5 pages.

Decision to Grant received in European Patent Application No. 14708136.8, mailed on Sep. 20, 2018, 2 pages.

Final Office Action mailed on Dec. 3, 2014, in U.S. Appl. No. 13/757,561, 21 pages.

Final Office Action mailed on Oct. 6, 2016, in U.S. Appl. No. 14/827,677, 8 pages.

First Office Action and Search Report Issued in Chinese Patent Application No. 201480007047.9, mailed on Nov. 17, 2017, 19 pages.

"Generating the activation code", Retrieved at http://cosm.com/docs/beta/device_management/provisioning/activation_code.html, on Aug. 23, 2012, 1 page.

Hess, A. et al. "Advanced Client/Server Authentication in TLS", Network and Distributed System Security Symposium, Feb. 2002, 12 pages.

Housley et al., "Advanced Encryption Standard (AES) Key Wrap with Padding Algorithm", Network Working Group, Aug. 2009, 13 pages.

Non-Final Office Action mailed on Feb. 12, 2016, in U.S. Appl. No. 14/827,677, 18 pages.

Non-Final Office Action mailed on Jul. 14, 2014, in U.S. Appl. No. 13/757,561, 19 pages.

Non-Final Office Action mailed on Jul. 14, 2017, in U.S. Appl. No. 15/495,543, 22 pages.

Non-Final Office Action mailed on Sep. 6, 2018, in U.S. Appl. No. 15/949,494, 21 pages.

Notice of Allowance Issued in Chinese Application No. 201480007047.9, mailed on Dec. 28, 2018, 4 pages (English Translation Provided).

Notice of Allowance mailed on Apr. 29, 2015, in U.S. Appl. No. 13/757,561, 14 pages.

Notice of Allowance Mailed on Dec. 11, 2017, in U.S. Appl. No. 15/495,543, 8 pages.

Notice of Allowance mailed on Jan. 2, 2019, in U.S. Appl. No. 15/949,494, 8 pages.

Notice of Allowance mailed on Jan. 27, 2017, in U.S. Appl. No. 14/827,677, 8 pages.

Notice of Allowance received in Japanese Patent application No. 2015-556087, mailed on May 31, 2018, 5 pages (English Translation Provided).

Notice of Allowance received in Korean Patent Application No. 10-2015-7023191, mailed on Nov. 23, 2020, 7 pages (English Translation Provided).

Office Action received in Japanese Application No. 2015-556087, mailed on Feb. 23, 2018, 13 pages. (English Translation Provided).

Second office Action received for Chinese Application No. 201480007047.9, mailed on Jul. 3, 2018, 5 pages (English Translation Provided).

Written Opinion of the International Preliminary Examining Authority Issued in International Application No. PCT/US2014/013465, Jan. 29, 2015, 6 pages.

Housley, et al., "RFC 3280: Internet X.509 Public Key Infrastructure Certificate and Certificate Revocation List (CRL) Profile", retrieved from https://datatracker.ietf.org/doc/rfc3280/, Internet Engineering Task Force, Apr. 2002, 127 pages.

International Search Report & Written Opinion received for PCT Application No. PCT/US2014/013465, Apr. 17, 2014, 11 pages.

Office Action received in Korean Patent Application in No. 10-2015-7023191, mailed on May 18, 2020, 8 pages. (English Translation Provided).

International Preliminary Report on Patentability (Chapter I) received for PCT Application No. PCT/US2023/081709, mailed on Jul. 3, 2025, 7 pages.

* cited by examiner

SECURING A COMPUTING DEVICE ACCESSORY

BACKGROUND

An increase of counterfeit computing device accessories has caused problems for legitimate accessory manufacturers and those who sell legitimate devices. To prevent this issue, numerous verification and authorization techniques have been developed to authenticate legitimate accessories and ban or block counterfeit accessories.

An example of an authentication technique is to include a security chip in each authentic device. This security chip may be utilized to locally authenticate the accessory with a host device. While this provides a good starting point, if the chips' information (e.g., cryptographic key, security certificate) is compromised, counterfeit devices may get past this authentication step.

As such, there is an ongoing need to provide verification methods to authorize legitimate computing device accessories and identify counterfeit computing device accessories. While the use of security chips provides a first authentication step, a security chip may be compromised allowing counterfeit devices to mimic authentic devices.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method, implemented at a computer system that includes a processor, including: establishing an encrypted communication channel with a remote accessory device that is connected to a host device; receiving a first device token from the remote accessory device; determining that the first device token exists within a token history associated with a device certificate of the remote accessory device; determining that the remote accessory device is an authentic device, based on the first device token existing within the token history; generating a second device token for the remote accessory device; storing the second device token in the token history associated with the device certificate of the remote accessory device; and sending the second device token to the remote accessory device.

In some aspects, the techniques described herein relate to a method, implemented at a computer system that includes a processor, for banning a remote accessory device, the method including: establishing an encrypted communication channel with a remote accessory device, the remote accessory device being connected to a host device; using the encrypted communication channel, obtaining a device certificate possessed by the remote accessory device; receiving a first device token from the remote accessory device; determining whether the first device token exists within a token history associated with the device certificate; and based on the first device token not existing within the token history, determining that the remote accessory device is counterfeit; and adding the device certificate to a ban list.

In some aspects, the techniques described herein relate to a computer system for authenticating a remote accessory device, including: a processing system; and a computer storage media that stores computer-executable instructions that are executable by the processing system to at least: obtain, over an encrypted network, a device certificate possessed by a remote accessory device; receive a first device token from the remote accessory device; determine whether the first device token exists within a token history associated with the device certificate; and based on the first device token existing within the token history, determine that the remote accessory device is an authentic device; generate a second device token for the remote accessory device; store the second device token in the token history associated with the device certificate; and send the second device token to the remote accessory device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

As the number of counterfeit remote accessory devices have increased, authenticating remote accessory devices from legitimate accessory manufacturers has turned into an ongoing challenge. In particular, counterfeit device manufacturers may utilize traditional authentication techniques (e.g., using stolen certificates), creating an ongoing need for new and improved ways to authenticate legitimate devices.

Previously, these challenges have been dealt with by utilizing a security chip to locally authenticate the remote accessory device with a host device. However, in some instances, the security chip may become comprised. In these instances, the counterfeit device may use a counterfeit security chip and the counterfeit device is authenticated by using a security chip authentication technique. Additionally, there may be security chip shortages resulting in a lack of security chips in legitimate devices. Therefore, there is a need for authentication techniques that do not rely solely on security chips.

At least some embodiments described herein remotely authenticate an accessory device. These embodiments therefore add an additional layer of authentication (e.g., a remote server-based authentication) to ensure authentic devices are registered and counterfeit devices are added to a ban list. Disclosed embodiments add an additional layer of security to devices made by device manufacturers to determine the device's legitimacy without relying on security chips which are easily compromised or unavailable.

Figure 1A:
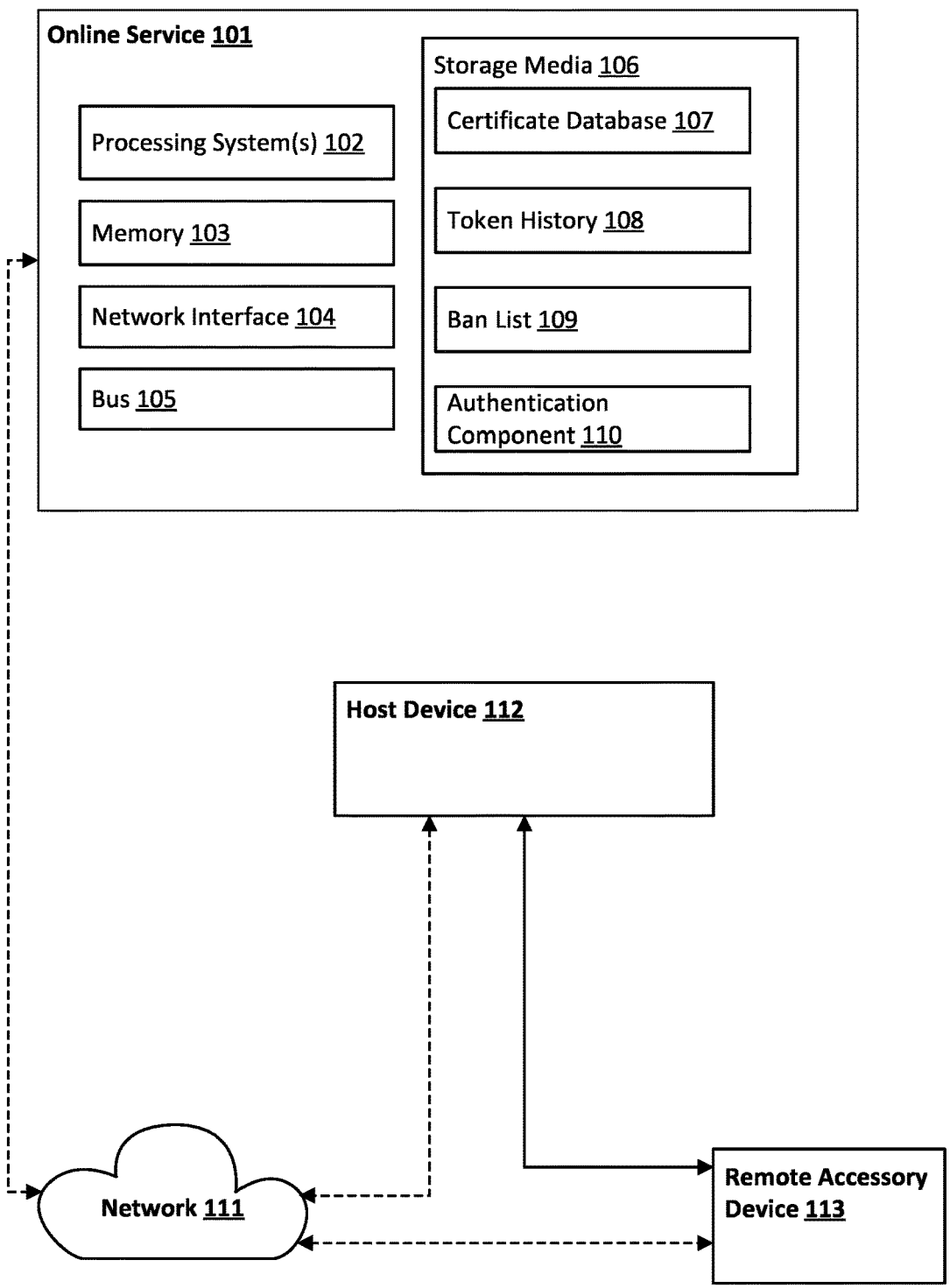
FIG. 1A illustrates an example computer architecture that facilitates authorization of a remote accessory device.

FIG. 1A illustrates an example computer architecture 100a that facilitates authentication of a remote accessory device. As shown, computer architecture 100a includes an online service 101 comprising processing system(s) 102 (e.g., a single processor, or a plurality of processors), memory 103 (e.g., system or main memory), storage media 106 (e.g., a single computer-readable storage medium, or a plurality of computer-readable storage media), all interconnected by a bus 105. As shown, in embodiments, online service 101 also includes a network interface 104 (e.g., one or more network interface cards) for interconnecting (via a network 111; e.g., a wide area network, such as the Internet) to a host device 112 and/or a remote accessory device 113. The host device 112 and the remote accessory device 113 are also connected either locally or remotely. As examples, in embodiments a local connection is a physical wired connection, a personal area network (PAN) connection such as a BLUETOOTH wireless connection, or a local area network (LAN) connection such as a WIFI wireless connection. As an example, in embodiments a remote connection is a wide area network (WAN) connection, such as using network 111.

The storage media 106 is illustrated as storing computer-executable instructions implementing at least an authentication component 110 for authenticating the remote accessory device 113. The storage media 106 is illustrated as also storing data such as a certificate database 107, a token history 108, and a ban list 109.

In embodiments, computer architecture 100a enables the remote accessory device 113 to be authenticated by the online service 101 via the network 111. In some embodiments, the remote accessory device 113 is pre-authenticated by the host device 112. In embodiments, the pre-authentication occurs automatically when the remote accessory device 113 is connected to the host device 112, or manually by a user request.

Figure 1B:
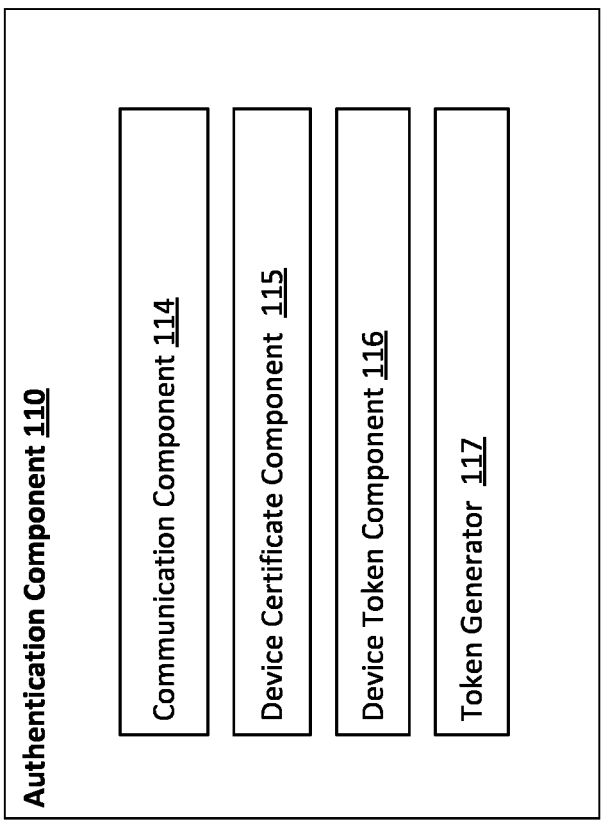
FIG. 1B illustrates an example of internal elements of an authentication component.

FIG. 1B illustrates an example 100b of internal elements of the authentication component 110 of FIG. 1A. Each internal component of the authentication component 110 depicted in FIG. 1B represents various functionalities that the authentication component 110 might implement in accordance with various embodiments described herein. It will be appreciated, however, that the depicted components—including their identity and arrangement—are presented merely as an aid in describing example embodiments of the authentication component 110.

The authentication component 110 depicted in FIG. 1B includes a communication component 114, a device certificate component 115, a device token component 116, and a token generator 117. In embodiments, the communication component 114 enables the online service 101 to establish an encrypted connection with the host device 112 and/or the remote accessory device 113. In embodiments, the device certificate component 115 enables the online service 101 to request and receive a device certificate from the remote accessory device 113, and to verify the validity of certificates. In embodiments, the device token component 116 enables online service 101 to request and receive a device token from the remote accessory device 113, and to verify the validity of device tokens. In embodiments, the token generator 117 enables the online service 101 to generate new device tokens and send the device token to the remote accessory device 113.

Figure 2:
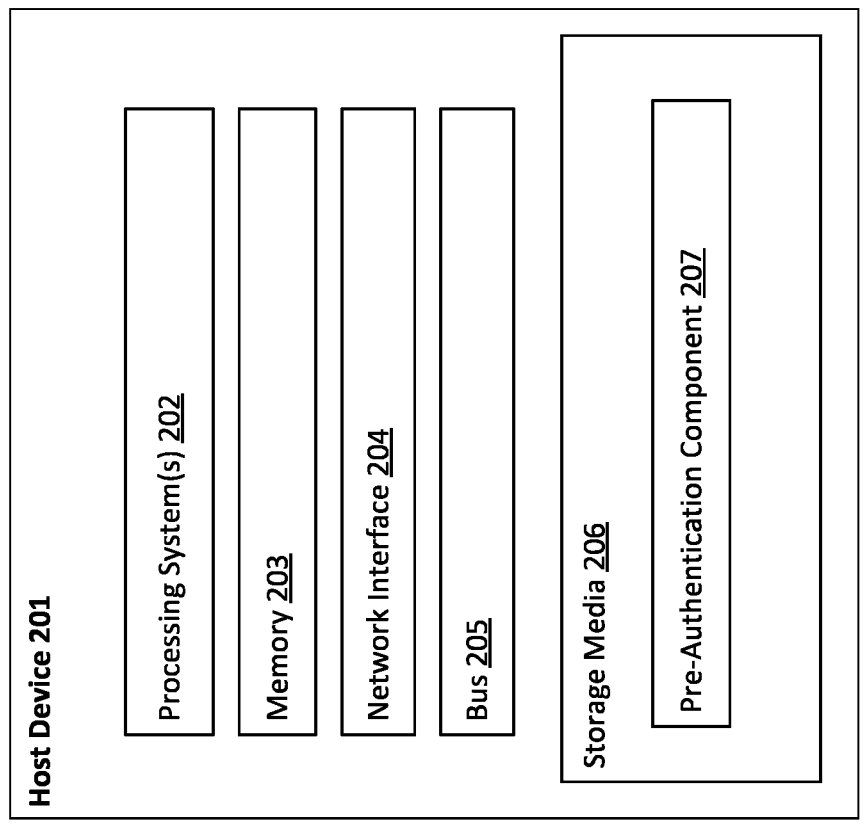
FIG. 2 illustrates an example of internal components of a host device.

FIG. 2 illustrates an example 200 of internal components of a host device 201, such as the host device 112 of FIG. 1A. Each internal component of the host device 201 depicted in FIG. 2 represents various functionalities that the host device 201 might implement in accordance with various embodiments described herein. It will be appreciated, however, that the depicted components—including their identity and arrangement—are presented merely as an aid in describing example embodiments of the host device 201.

The host device 201 depicted in FIG. 2 includes processing system(s) 202 (e.g., a single processor, or a plurality of processors), memory 203 (e.g., system or main memory), storage media 206 (e.g., a single computer-readable storage medium, or a plurality of computer-readable storage media), all interconnected by a bus 205. As shown, the host device 201 may also include a network interface 204 (e.g., one or more network interface cards) for interconnecting (via network 111) to the online service 101. The host device 201 may also connect locally (e.g., physical wired connection, PAN, LAN) or remotely (e.g., WAN) to the remote accessory device 113.

The storage media 206 is illustrated as storing computer-executable instructions implementing at least a pre-authentication component 207 for pre-authenticating the remote accessory device 113. In embodiments, the pre-authentication component 207 authenticates the remote accessory device 113 based on a security chip at the remote accessory device 113. In some embodiments, the pre-authentication component 207 determines if a device certificate (e.g., stored within a security chip) associated with the remote accessory device 113 is valid. To determine if the device certificate is valid, in some embodiments, the pre-authentication component 207 compares the device certificate to a known device certificate list. In some embodiments, the pre-authentication is performed locally and the device certificate list is stored in the storage media 206 of the host device 201. In other embodiments, the pre-authentication is performed remotely and the host device 201 accesses a certificate list from the storage media 106 of the online service 101. In embodiments, the remote accessory device 113 lacks a device certificate or a security chip, and the remote accessory device 113 is unable to be used with the host device 112 immediately, therefore identifying counterfeit devices quickly and efficiently.

Figure 3:
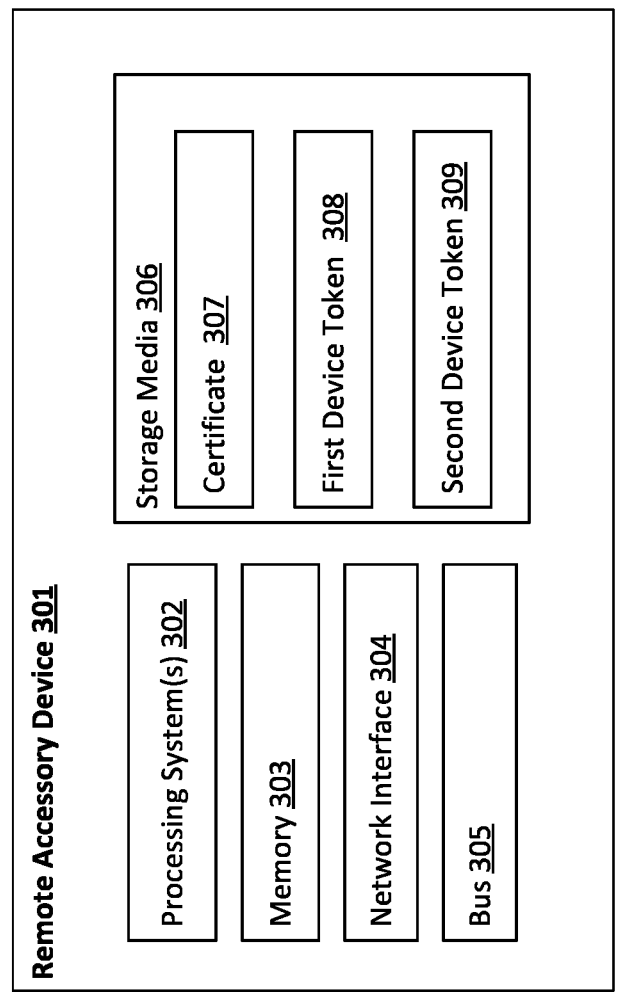
FIG. 3 illustrates an example of internal components of a remote accessory device.

FIG. 3 illustrates an example 300 of internal components of a remote accessory device 301, such as the remote accessory device 113 of FIG. 1A. Each internal component of the remote accessory device 301 depicted in FIG. 3 represents various functionalities that the remote accessory device 301 might implement in accordance with various embodiments described herein. It will be appreciated, however, that the depicted components—including their identity and arrangement—are presented merely as an aid in describing example embodiments of the remote accessory device 301.

The remote accessory device 301 depicted in FIG. 3 includes processing system(s) 302 (e.g., a single processor, or a plurality of processors), memory 303 (e.g., system or main memory), storage media 306 (e.g., a single computer-readable storage medium, or a plurality of computer-readable storage media), all interconnected by a bus 305. As shown, the remote accessory device 301 may also include a network interface 304 (e.g., one or more network interface cards) for interconnecting (via network 111) to the online service 101. The remote accessory device 301 may also connect locally or remotely to the host device 112.

The storage media 306 is illustrated as storing data associated with the remote accessory device 301. For example, FIG. 3 illustrates the storage media 306 as storing a device certificate 307, a first device token 308, and a second device token 309.

Figure 4:
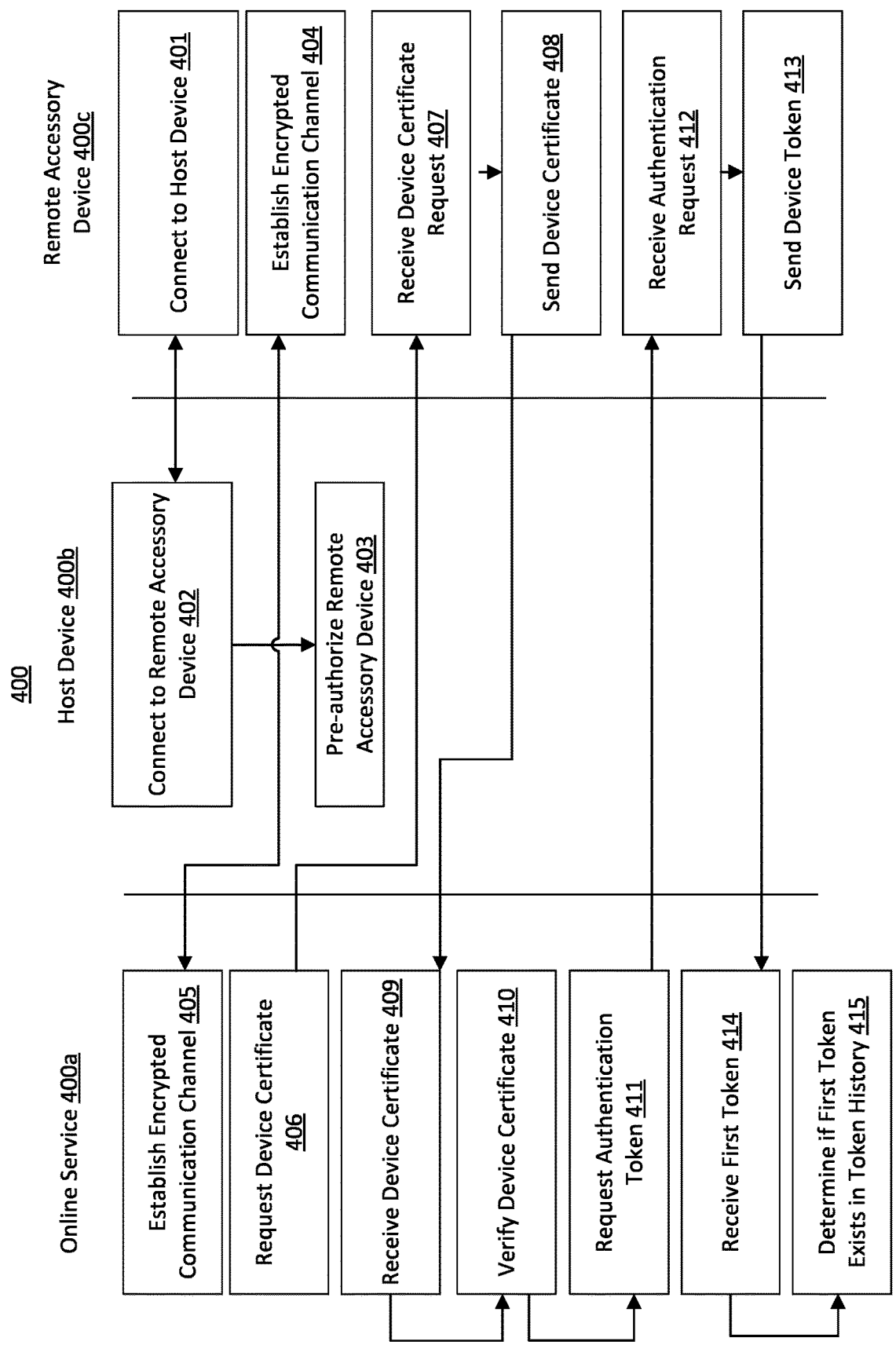
FIG. 4 illustrates an example diagram of authorizing a remote accessory device.

FIG. 4 illustrates an example authentication diagram showing a method 400 for authenticating a remote accessory device 113. The authentication diagram includes an online service 400a (e.g., online service 101), a host device 400b (e.g., host device 112), and a remote accessory device 400c (e.g., remote accessory device 113). As an example, the online service 400a is an online gaming service (e.g., Xbox Live, PlayStation Network, Nintendo Switch Online), the host device 400b is a gaming console (e.g., an Xbox, a PlayStation, a Nintendo Switch), and the remote accessory device 400c is a gaming controller (e.g., an Xbox controller, a PlayStation controller, a Nintendo Switch controller). In some embodiments, the gaming console is a virtual gaming console. In embodiments, instructions for implementing method 400 are encoded as computer-executable instructions (e.g., authentication component 110, pre-authentication component 207) stored on a computer storage media that are executable by a processing system to cause online service 400a, host device 400b, and/or remote accessory device 400c to perform the method.

Referring now to specifics of method 400, initially the remote accessory device 400c and host device 400b connect to one another. In some embodiments the host device is locally connected to the remote accessory device. In other embodiments, the host device is remotely connected to the remote accessory device. For example, the remote accessory device 400c connects to the host device 400b (act 401), and the host device 400b connects to the remote accessory device 400c (act 402). The connection may occur wirelessly by using BLUETOOTH, over a wireless network, over a wired connection, or other appropriate connection methods.

Once the remote accessory device 400c and the host device 400b are connected (e.g., act 401 and act 402), the host device 400b performs a pre-authorization of the remote accessory device 400c (act 403). In embodiments, act 403 includes the remote accessory device having been pre-authorized by the host device. The pre-authorization may occur automatically when the host device 400b and remote accessory device 400c are connected (e.g., based on act 401 and act 402), when requested by a user, or when requested by a third party. In embodiments, the pre-authorization occurs regardless of if the host device 400b is connected to a network or not. In embodiments, the host device pre-authorizes the remote accessory device based only on communications between the remote accessory device and the host device. In some embodiments, the pre-authentication component 207 determines if the device certificate associated with the remote accessory device 113 is valid. To determine if the device certificate is valid, in some embodiments, the pre-authentication component 207 compares the device certificate to a known device certificate list. In some embodiments, the pre-authentication is performed locally and the device certificate list is stored in the storage media 206 of the host device 201. In the instance where other authentication methods are temporarily unavailable, the pre-authentication provides an efficient first authentication until other authentication techniques are performed.

Next, the online service 400a and remote accessory device 400c establish an encrypted communication channel (act 404 and act 405). In some embodiments, the encrypted communication channel is established only when the pre-authorization succeeds. In other embodiments, the encrypted communication channel is established whether the pre-authorization succeeds or fails. In some embodiments, the encrypted communication channel is a TLS 1.3 communication channel, though a variety of encryption protocols could be used. In some embodiments (e.g., when the remote accessory device 400c is capable of communicating over network 111), the encrypted communication channel is established between the remote accessory device 400c and the online service 400a directly. In other embodiments (e.g., when the remote accessory device 400c is incapable of communicating over network 111), the encrypted communication channel is facilitated by an intermediary, such as the host device 400b.

From the perspective of the online service 400a, in embodiments, act 405 comprises establishing an encrypted communication channel with a remote accessory device, the remote accessory device being connected to a host device. In an example, the communication component 114 establishes an encrypted communications channel with the remote accessory device 400c, either directly or via the host device 400b.

In some embodiments, using the encrypted communication channel, the online service 400a requests a device certificate from the remote accessory device 400c (act 406). From the perspective of the online service 400a, in embodiments act 406 comprises sending, to the remote accessory device, a request for the device certificate. The remote accessory device 400c, in turn, receives the device certificate request (act 407) and sends the device certificate to the online service 400a over the encrypted communication channel (act 408). In other embodiments, the remote accessory device 400c sends the device certificate (act 408) without a request from the online service 400a.

Whether expressly requested or not, in embodiments the online service 400a receives the device certificate from the remote accessory device 400c (act 409). For example, in some embodiments, the online service 400a explicitly requests the device certificate from the remote accessory device 400c (act 406). In other embodiments, the remote accessory device 400c sends (act 408) the device certificate to the online service 400a without an explicit request. In embodiments, act 409 comprises, using the encrypted communication channel, obtaining a device certificate possessed by the remote accessory device. In an example, the device certificate component 115 receives a device certificate from remote accessory device 400c.

In embodiments, upon receipt of the device certificate, the online service 400a verifies that the device certificate is valid. This validation process may include checking the device certificate against a certificate database 107 to determine whether the device certificate 307 exists within the certificate database 107. The verification process may further include, in some embodiments, checking if the device certificate has previously been used by any remote accessory device. In the case where the device certificate has not been used, the online service 400a may register the remote accessory device 400c in an online database. In some embodiments, the database stores a list of registered devices. As an example, a counterfeit device may use a compromised device certificate which has previously been registered. In this case, when the counterfeit device attempts to be registered, the device is quickly identified as counterfeit and added to a ban list.

From the perspective of the online service 400a, the validation process includes determining the device certificate is valid. In an example, the device certificate is determined valid by the device certificate component 115. In some embodiments, the validation process comprises determining that the remote accessory device is counterfeit is based on identifying the device certificate on a ban list. In other embodiments, the validation process comprises determining that the remote accessory device is counterfeit is based on the device certificate being neither in the online database nor the ban list.

In some embodiments, once the device certificate has been received by the online service 400a (act 409), and the online service 400a has verified validity of the certificate (act 410), the online service 400a sends a request for an authentication token to the remote accessory device 400c (act 411). The remote accessory device 400c receives the request for the authentication token (act 412), and sends a device token (first token) stored at the remote accessory device 400c (act 413). From the perspective of the online service 400a, act 411 comprises sending, to the remote accessory device, a request for an authentication token and act 414 comprises receiving the first device token from the remote accessory device based on the request. In examples, the device token component 116 requests and receives the device token from the remote accessory device 400c. In other embodiments, the remote accessory device 400c sends the device token (first token) to the online service 400a without receiving an express request from the online service 400a. Thus, in some embodiments, method 400 lacks act 411 and act 412. In either case, the online service 400a receives the token (act 414) and determines whether the token exists in a token history (act 415) maintained by the online service 400a (e.g., token history 108). In some embodiments, the remote accessory device 400c sends the device certificate and the device token to the online service 400a in a single operation. In some embodiments, the remote accessory device 400c sends the device certificate and/or device token to the host device 400b, which acts as an intermediary to forward the device certificate and/or the device token to the online service 400a.

Figure 5:
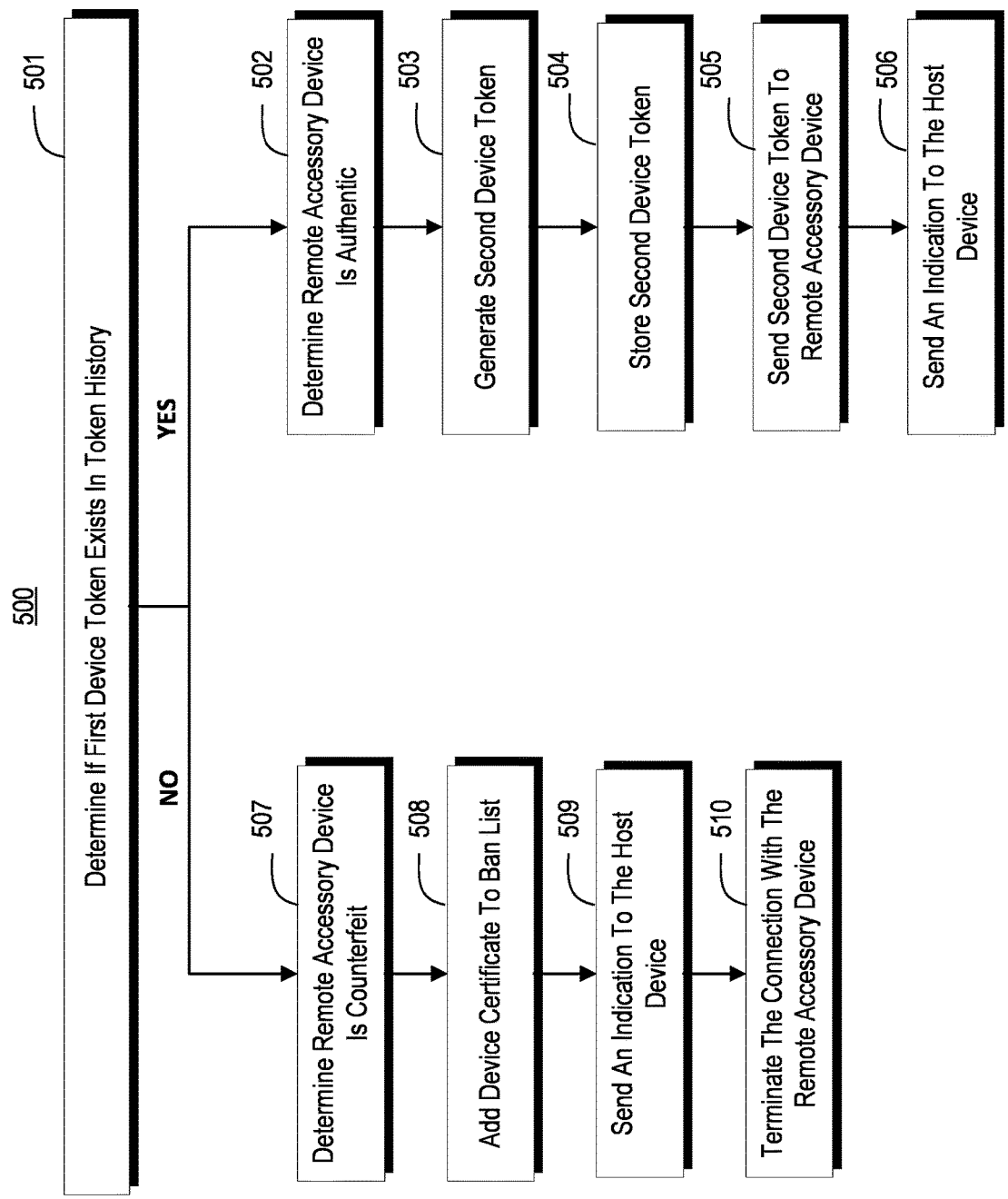
FIG. 5 illustrates a flow chart of an example method for actions based on authenticated or counterfeit remote accessory devices.

Continuing from FIG. 4, FIG. 5 illustrates a flow chart of an example method 500, comprising acts that occur once it is determined if the first device token exists in the token history (act 414, act 501). In embodiments, instructions for implementing method 500 are encoded as computer-executable instructions (e.g., authentication component 110) stored on a computer storage media (e.g., storage media 106) that are executable by a processing system (e.g., processing system(s) 102) to cause a computer system (e.g., online service 101) to perform the method. The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

In some embodiments, method 500 operates to authenticate a remote accessory device. Referring to act 501, when the first device token exists in the token history (e.g., the "Yes" branch from act 501), in embodiments, the remote accessory device is determined to be authentic (act 502). The online service 101 then generates a second device token (act 503) and stores the second device token (act 504) in the device token history (e.g., token history 108). The online service 101 sends the second device token to the remote accessory device (act 505). In some embodiments, the online service 101 sends an indication to the host device (act 506) that the remote accessory device 113 has been authenticated. In embodiments, the indication allows the remote accessory device 113 to continue to be used with the host device 112.

From the perspective of the online service 400a, in embodiments based on the first device token existing within the token history (act 501), act 502 comprises determining that the remote accessory device is an authentic device. As an example, the device token component 116 determines whether the first device token exists in the token history 108. In embodiments, act 503 comprises generating a second device token for the remote accessory device and storing the second device token in the token history associated with the device certificate. In an example, the token generator 117 generates the second token and also stores the second token in the token history. Act 504, in embodiments, comprises sending the second device token to the remote accessory device. As an example, the communication component 114 sends the second device token from the online service 400a to the remote accessory device 400c either directly or through the host device 400b. Act 506 comprises sending an indication, to the host device, that the remote accessory device is authentic.

The token history 108 may store the first device token, the second device token, and other generated tokens (e.g., up to n device tokens, where n is a positive integer). In some embodiments, online service 101 deletes the first device token from the token history once the second device token is generated. In other embodiments, the online service 101 deletes tokens from the token history 108 once a set number of token are stored. Other embodiments, the online service 101 periodically delete tokens from the token history 108. In even other embodiments, the token history 108 may be stored permanently.

In some embodiments, method 500 operates to ban a remote accessory device. Referring again to act 501, when the first device token does not exist in the token history (e.g., the "No" branch from act 501), in embodiments, the remote accessory device is determined to be a counterfeit (act 507). The device certificate is added to a ban list (act 508) stored by the online service 101 (e.g., ban list 109). The communication component 114 then sends an indication to the host device 112 (act 509). In some embodiments, based on this indication, the host device 112 terminates the connection with the remote accessory device (act 510). In some embodiments, the host device 112 waits to terminate the connection with the remote accessory device 113 until multiple attempts to authenticate the device have been performed. In some embodiments, the online service 101 shares the ban list 109 with multiple devices (e.g., multiple host devices and remote accessory devices). In some embodiments, the online service 101 checks the ban list 109 for the received device certificate prior to requesting the device token. If the received device certificate exists in the ban list 109, the online service 101 notifies that host device 112, and the connection between the host device 112 and remote accessory device 113 may be terminated immediately without continuing the remote authentication process (e.g., method 500).

From the perspective of the online service 400a, in embodiments based on the first device token not existing within the token history (act 501), act 507 comprises determining that the remote accessory device is counterfeit. As an example, the device token component 116 determines whether the first device token exists in the token history 108. In embodiments, act 508 comprises adding the device certificate to a ban list. In embodiments, act 509 comprises sending an indication to the host device that the remote accessory device is banned based on the first device token not existing within the token history. As shown in act 510, in some embodiments the host device terminates a connection with the remote accessory device based on receiving an indication from the online service.

Embodiments of the disclosure may comprise or utilize a special-purpose or general-purpose computer system (e.g., online service 101) that includes computer hardware, such as, for example, a processor system (e.g., processing system (s) 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 106). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 104), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, comprising:
    establishing an encrypted communication channel with a remote accessory device that is connected to a host device;
    receiving a first device token from the remote accessory device;
    determining that the first device token exists within a token history associated with a device certificate of the remote accessory device;
    determining that the remote accessory device is an authentic device, based on the first device token existing within the token history;
    sending an indication, to the host device, that the remote accessory device is authentic, based on the first device token existing within the token history;
    generating a second device token for the remote accessory device;
    storing the second device token in the token history associated with the device certificate of the remote accessory device; and
    sending the second device token to the remote accessory device.

2. The method of claim 1, further comprising determining the device certificate is valid.

3. The method of claim 1, the remote accessory device having been pre-authorized by the host device.

4. The method of claim 3, wherein the host device pre-authorizes the remote accessory device based only on communications between the remote accessory device and the host device.

5. The method of claim 1, wherein the host device is locally connected to the remote accessory device.

6. The method of claim 1, wherein the host device is remotely connected to the remote accessory device.

7. The method of claim 1, further comprising sending, to the remote accessory device, a request for the device certificate.

8. The method of claim 1, further comprising sending, to the remote accessory device, a request for an authentication token, wherein the first device token is received based on sending the request.

9. The method of claim 1, wherein the host device is a gaming console, and the remote accessory device is a gaming controller.

10. The method of claim 9, wherein the gaming console is a virtual gaming console.

11. A method, implemented at a computer system that includes a processor, comprising:
    establishing an encrypted communication channel with a remote accessory device that is connected to a host device;
    using the encrypted communication channel, obtaining a device certificate possessed by the remote accessory device;
    receiving a first device token from the remote accessory device;
    determining that the first device token does not exist within a token history associated with the device certificate;
    determining that the remote accessory device is counterfeit based on the first device token not existing within the token history; and
    adding the device certificate to a ban list.

12. The method of claim 11, further comprising, sending an indication, to the host device, that the remote accessory device is banned.

13. The method of claim 12, wherein, based on the indication, the host device terminates a connection with the remote accessory device.

14. The method of claim 11, wherein the remote accessory device was pre-authorized by the host device.

15. The method of claim 14, wherein the host device pre-authorizes the remote accessory device based only on communications between the remote accessory device and the host device.

16. The method of claim 11, further comprising requesting an authentication token from the remote accessory device, wherein the first device token is received based on requesting the authentication token.

17. The method of claim 11, wherein the host device is a gaming console, and the remote accessory device is a gaming controller.

18. A computer system comprising:
    a processing system; and
    a computer storage media that stores computer-executable instructions that are executable by the processing system to at least:
        obtain, over an encrypted network, a device certificate possessed by a remote gaming controller that is connected to a gaming console;
        receive a first device token from the remote gaming controller;
        determine that the first device token exists within a token history associated with the device certificate;
        determine that the remote gaming controller is an authentic device based on the first device token existing within the token history;
        generate a second device token for the remote gaming controller;
        store the second device token in the token history associated with the device certificate; and send the second device token to the remote gaming controller.

19. The computer system of claim 18, the remote gaming controller having been pre-authorized by a host device.

20. The computer system of claim 18, wherein the computer-executable instructions that are executable by the processing system to, based on the first device token existing within the token history, send an indication, to the gaming console, that the remote gaming controller is authentic.

* * * * *